(12) United States Patent
Wu et al.

(10) Patent No.: US 10,344,828 B2
(45) Date of Patent: Jul. 9, 2019

(54) DUAL-SHAFT PUSH-MOVING VARYING SPEED DEVICE

(71) Applicant: INDUSTRIAL TECHNOLOGY RESEARCH INSTITUTE, Hsin-Chu (TW)

(72) Inventors: Meng-Ru Wu, Taipei (TW); Chia Tsao, New Taipei (TW); Peng-Yu Chen, Toufen (TW); Jui-Tang Tseng, Hsinchu (TW); Cheng-Ping Yang, Taoyuan (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 75 days.

(21) Appl. No.: 15/834,997

(22) Filed: Dec. 7, 2017

(65) Prior Publication Data
US 2019/0120329 A1    Apr. 25, 2019

(30) Foreign Application Priority Data
Oct. 20, 2017    (TW) .............................. 106136223 A

(51) Int. Cl.
*F16H 3/24* (2006.01)
*F16H 37/08* (2006.01)
*F16H 63/32* (2006.01)

(52) U.S. Cl.
CPC ............ *F16H 3/24* (2013.01); *F16H 37/0813* (2013.01); *F16H 63/32* (2013.01); *F16H 2200/0043* (2013.01)

(58) Field of Classification Search
CPC ...... F16H 3/24; F16H 37/0813; F16H 3/0915; F16H 3/091; F16H 48/24; F16H 2048/3694; F16H 2048/366
(Continued)

(56) References Cited

U.S. PATENT DOCUMENTS 4,095,665 A    6/1978 Armfield
5,620,387 A *  4/1997 Janiszewski ............. B60K 1/00
                                              475/150
(Continued)

FOREIGN PATENT DOCUMENTS

CN    201866176 U    6/2011
CN    103195880 A    7/2013
(Continued)

OTHER PUBLICATIONS

TIPO, Office Action dated May 31, 2018.
(Continued)

*Primary Examiner* — Roger L Pang
(74) *Attorney, Agent, or Firm* — Rabin & Berdo, P.C.

(57) ABSTRACT

A dual-shaft push-moving varying speed device includes a drive unit; an input shaft, having at least an odd-numbered input gear and at least an even-numbered input gear is coupled with the drive unit; an output shaft, having an end thereof penetrate through the input shaft and the drive unit, and the another end thereof possesses an output gear; a transmission shaft, including at least an odd-numbered output gear, at least an even-numbered output gear, and a transmission gear where the odd-numbered output gear is meshed with the corresponding odd-numbered input gear while the even-numbered output gear is meshed with the corresponding even-numbered input gear, and the transmission gear is meshed with the output gear; and at least a push-moving fork, being furnished between the odd-numbered input gear and the even-numbered input gear, selectively pushes the odd-numbered input gear and the even-numbered input gear to move.

20 Claims, 3 Drawing Sheets

(58) Field of Classification Search
USPC .......... 74/329; 475/152, 200, 206, 198, 203, 475/225; 180/371
See application file for complete search history.

(56) References Cited

U.S. PATENT DOCUMENTS

| | | | |
|---|---|---|---|
| 5,667,029 A | | 9/1997 | Urban et al. |
| 6,864,607 B2* | | 3/2005 | Hashimoto .............. B60K 1/00 180/65.1 |
| 7,316,627 B2 | | 1/2008 | Bennett |
| 7,390,278 B2 | | 6/2008 | Krisher |
| 7,891,263 B2 | | 2/2011 | Mowbray et al. |
| 8,454,473 B2 | | 6/2013 | Reitz |
| 8,556,760 B2 | | 10/2013 | Mack et al. |
| 8,876,643 B2* | | 11/2014 | Fickel ...................... F16H 3/54 180/65.235 |
| 9,073,538 B2 | | 7/2015 | Mack et al. |
| 9,221,334 B2 | | 12/2015 | Knoblauch |
| 9,267,510 B2 | | 2/2016 | Tadokoro et al. |
| 9,637,127 B1 | | 5/2017 | Cooper |
| 2005/0026732 A1 | | 2/2005 | Krisher et al. |
| 2009/0088287 A1 | | 4/2009 | Chludek et al. |
| 2009/0211824 A1* | | 8/2009 | Knoblauch ............. B60K 1/00 180/65.7 |
| 2010/0267508 A1 | | 10/2010 | Hvolka et al. |
| 2014/0228165 A1 | | 8/2014 | Frank et al. |
| 2017/0246944 A1* | | 8/2017 | Goleski .................. B60K 6/36 |

FOREIGN PATENT DOCUMENTS

| | | |
|---|---|---|
| CN | 206000985 U | 3/2017 |
| CN | 206049355 U | 3/2017 |
| JP | 5933125 B2 | 6/2016 |
| TW | 291936 | 11/1996 |
| TW | 509651 B | 11/2002 |
| TW | M365603 U | 9/2009 |
| TW | I393825 B | 4/2013 |
| TW | I534037 B | 5/2016 |
| TW | M541539 U | 5/2017 |
| TW | M542715 U | 6/2017 |
| TW | 201725136 A | 7/2017 |

OTHER PUBLICATIONS

Faid, A Highly Efficient Two Speed Transmission for Electric Vehicles, EVS28, KINTEX, Korea, May 3-6, 2015, pp. 1-22.

Viotto, A Novel Seamless 2-Speed Transmission System for Electric Vehicles: Principles and Simulation Results, Electronic Systems for Vehicle Propulsion Symposium, Nov. 8-9, 2011, Detroit, MI.

Sorniotti et al., Analysis and Simulation of the Gearshift Methodology for a Novel Two-Speed Transmission System for Electric Powertrains With Central Motor, pp. 1-46.

Grewe et al., Defining the General Motors 2-Mode Hybrid Transmission, SAE International, 2007.

Caricchi et al., Design and Construction of a Wheel-Directly-Coupled Axial-Flux PM Motor Prototype for EVs, pp. 254-261.

Holdstock, Investigation into multiple-speed transmissions for electric vehicles, pp. 1-187.

* cited by examiner

DUAL-SHAFT PUSH-MOVING VARYING SPEED DEVICE

CROSS REFERENCE TO RELAYED APPLICATION

This application also claims priority to Taiwan Patent Application No. 106136223 filed in the Taiwan Patent Office on Oct. 20, 2017, the entire content of which is incorporated herein by reference.

FIELD OF THE DISCLOSURE

The disclosure relates to a dual-shaft push-moving varying speed device, and more particularly, to a dual-shaft push-moving varying speed device that employs a dual-shaft structure to achieve the object of diminishing the volume of the device.

DESCRIPTION OF THE PRIOR ART

Varying speed mechanism, that provides the requirements of different speed or torque when the vehicle is moving, is an indispensable component of an electrical vehicle/conventional vehicle (hereafter referred to as a vehicle).

The above-mentioned speed and torque conversion is achieved through a multiple of gears, thereby the existing varying speed mechanism has a combination of a multiple of gears therein. However, the gear combination makes the volume of the existing gearbox relatively too large, and since the relatively larger volume of varying speed mechanism will cause the difficulty in the design of the vehicle in that it needs a relatively larger space to contain the existing varying speed mechanism.

For the above-mentioned reasons, in order to diminish the volume of the existing varying speed mechanism, some designs of the varying speed mechanism employs a push-moving structure. However, the push-moving structure can only diminish a portion of the existing varying speed mechanism and can not achieve the expected diminishing amount. Therefore, just how to reduce the volume of the existing varying speed mechanism still has rooms to be improved.

SUMMARY OF THE DISCLOSURE

The disclosure is a dual-shafts push-moving varying speed device, comprising:
  a drive unit;
  an input shaft having at least an odd-numbered input gear and at least an even-numbered input gear is coupled with the drive unit;
  an output shaft with an end thereof penetrates through the input shaft and the drive unit, while its other end has an output gear;
  a transmission shaft having at least an odd-numbered output gear meshing with the corresponding odd-numbered input gear, at least an even-numbered output gear meshing with the corresponding even-numbered input gear, and a transmission gear meshing with the output gear; and
  at least a push-moving fork furnished between the odd-numbered input gear and the even-numbered input gear, and is selectively pushed to move the odd-numbered input gear and the even-numbered input gear.

BRIEF DESCRIPTION OF THE DRAWINGS

The accomplishment of this and other objects of the disclosure will become apparent from the following description and its accompanying drawings of which.

DETAILED DESCRIPTION OF THE PREFERRED EMBODIMENT

The following descriptions are embodiments of the disclosure employing some particular concrete examples. Those people skilled in the art are capable of easily realizing the advantages and efficacies of the disclosure through the content disclosed by the patent specification of the disclosure.

Figure 1:
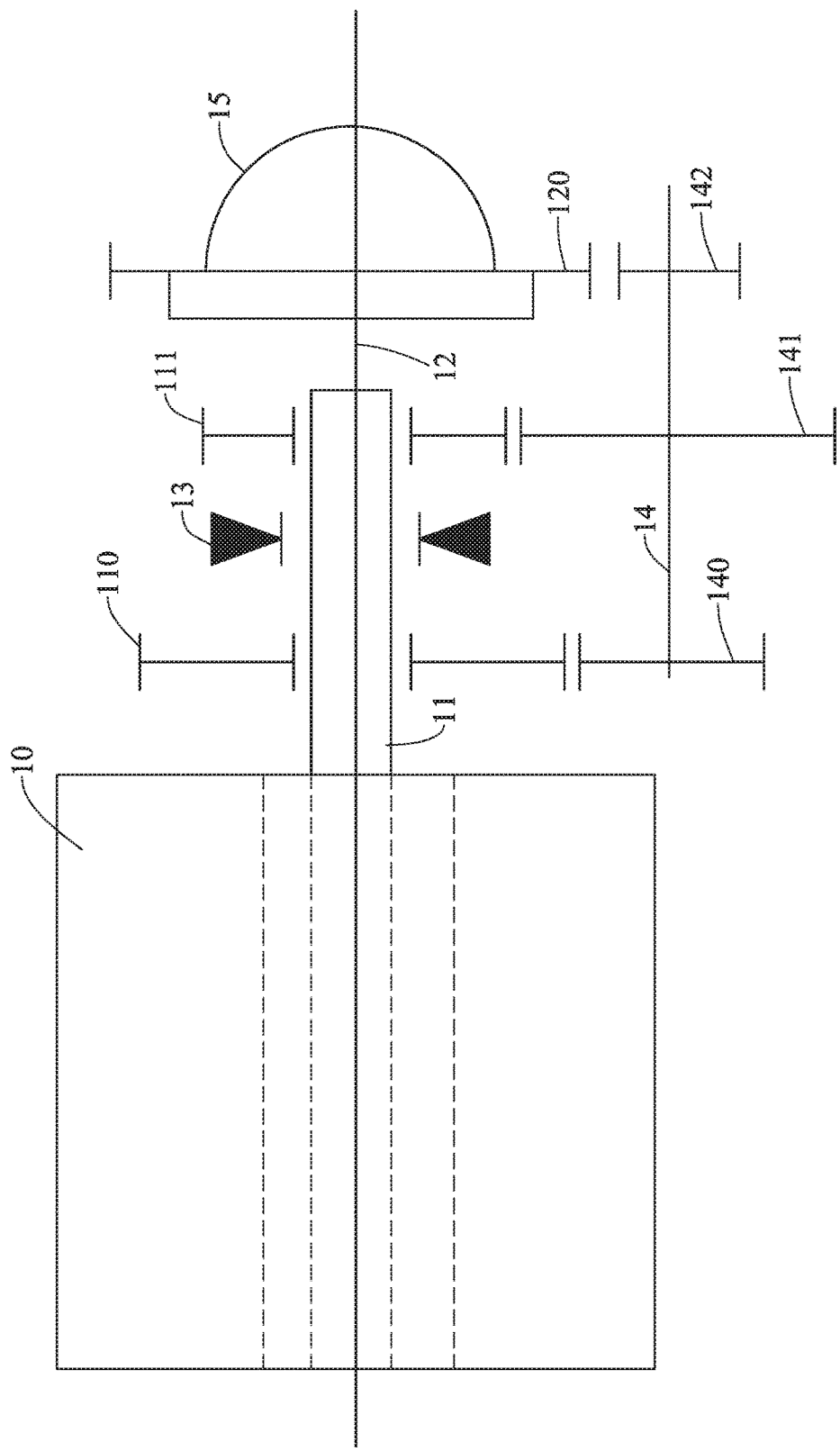
FIG. 1 is a schematic view of the first embodiment of the dual-shaft push-moving varying speed device of the disclosure.

FIG. 1 is a schematic view of the first embodiment of the dual-shaft push-moving varying speed device of the disclosure. As shown in FIG. 1, the dual-shaft push-moving varying speed device of the disclosure being a two-speed varying speed system includes a drive unit (10), an input shaft (11), an output shaft (12), a push-moving fork (13), a transmission shaft (14), an odd-numbered gear pair, and an even-numbered gear pair, wherein the odd-numbered gear pair includes a first odd-numbered input gear (110) and a first odd-numbered output gear (140) while the even-numbered gear includes a first even-numbered input gear (111) and a first even-numbered output gear (141).

The drive unit (10) can be an engine or a motor. The input shaft (11) having a first odd-numbered input gear (110) and a first even-numbered input gear (111) is coupled with the drive unit (10). The first odd-numbered input gear (110) and the first even-numbered input gear (111) are furnished on the two sides of the push-moving fork (13). In different embodiments, the above-mentioned input gears, the odd-numbered input gear and the even-numbered input gear can be plural in number. In the present embodiment, the first odd-numbered input gear (110) and the first even-numbered input gear (111) are used to facilitate depiction. The odd-numbered input gear (110) and the even-numbered input gear (111) are secured at the outer edge of the input shaft (11) and are rotated together with the input shaft (11) which is a hollow shaft.

In the present embodiment, the first odd-numbered input gear (110) and the first even-numbered input gear (111) are a gear pair where the first odd-numbered input gear (110) can be considered as an input gear of the first speed gear while the first even-numbered input gear (111) can be considered as an input gear of the second speed gear.

An end of the output shaft (12) is penetrated through the input shaft (11) and the drive unit (10) while the other end of the output shaft (12) possesses an output gear (120). The output gear (120), is either coupled with a differential (15), or the output shaft (12) is mutually connected to the differential (15). Since the output shaft (12) is penetrated through and furnished in the input shaft (11), thereby the output shaft (12) and the input shaft (11) form a dual-shaft structure.

The push-moving fork (13) is positioned between the first odd-numbered input gear (110) and the first even-numbered input gear (111). In different embodiments, the odd-numbered input gear and the even-numbered input gear can be plural in number. The push-moving fork (13) is furnished between each of the odd-numbered input gears and each of the even-numbered input gears. In the present embodiment, that the push-moving fork (13) is positioned between the first odd-numbered input gear (110) and the first even-numbered input gear (111) is used to facilitate depiction, thereby, as shown in FIG. 1, the push-moving fork (13), the output shaft (12), and the input shaft (11) are all positioned in the same axial direction. Therefore, the push-moving fork (13), the output shaft (12), and the input shaft (11) are considered as a technical means in a common shaft.

Among the other embodiments e.g. the after-mentioned embodiment, if the push-moving fork (13) is set up to be as two or as least two pieces and adding a second odd-numbered input gear, then the second odd-numbered input gear can be considered as a third speed gear. If the newly added odd-numbered input gear is plural in number, then sequentially those odd-numbered input gears are the first speed gear, the third speed gear, and the fifth gear till the $(N-1)^{th}$ speed gear where $(N-1)$ is an odd number.

In the after-mentioned embodiment, if the push-moving fork (13) is set up to be as three or at least three pieces and adding a second even-numbered input gear, then the second even-numbered input gear can be considered as the fourth speed gear. If the newly added even-numbered input gear is plural in number, then sequentially those even-numbered input gears are the second speed gear, the fourth speed gear, and the sixth gear till the $N^{th}$ speed gear where N is an even number.

The transmission shaft (14) includes a first odd-numbered output gear (140), a first even-numbered output gear (141), and a transmission gear (142). Among them, the first odd-numbered output gear (140) is meshed with the first odd-numbered input gear (110), the first even-numbered output gear (141) is meshed with the first even-numbered input gear (111) while the transmission gear (142) is meshed with output gear (120). In different embodiments, the odd-numbered output gear and the even-numbered output gear can be plural in number, and each of the odd-numbered output gears is meshed with each of the odd-numbered input gears while each of the even-numbered output gear is meshed with each of the even-numbered input gear. In the present embodiment, the first odd-numbered output gear (140) and the first even-numbered output gear (141) are used for depiction. Moreover, the output shaft (12) is mutually parallel to the transmission shaft (14).

As shown in FIG. 1, the push-moving fork (13) pushes to move the first odd-numbered input gear (110) making the input shaft (11), which is driven by the drive unit (10), drive the first odd-numbered input gear (110). Subsequently, the first odd-numbered input gear (110) drives the first odd-numbered output gear (140) which again drives the transmission shaft (14).

Sequentially the transmission shaft (14) drives the transmission gear (142), the transmission gear (142) drives the output gear (120), the driven output gear (120) further drives the output shaft (12) making the output shaft (12) output torque or power to drive the differential (15).

As described above, the push-moving fork (13) pushes to move the first odd-numbered input gear (110). The power, originated from the drive unit (10), performs varying speed gear sequentially through the first odd-numbered input gear (110), the first odd-numbered output gear (140), transmission gear (142), output gear (120), and the transmission shaft (14). The varying speed gear can be considered as the varying speed of the first speed gear.

The drive unit (10) continuously drives the input shaft (11). The push-moving fork (13) departs from and does not drive the first odd-numbered input gear (110) anymore and further make it does not drive the odd-numbered output gear (140) anymore.

The push-moving fork (13) pushes the first even-numbered input gear (111) to move making the input shaft (11), which is driven by the drive unit (10), drive the first even-numbered input gear (111) which further drives the first even-numbered output gear (141).

The transmission shaft (14) is to drive the transmission gear (142) which is to drive the output gear (120). The driven output gear (120) further drives the differential (15) and the output shaft (12) to make the output shaft (12) output torque or power.

As described above, the push-moving fork (13) pushes the first even-numbered input gear (111) to move. The power, originated from the drive unit (10), performs varying speed gear sequentially through the first even-numbered input gear (111), the first even-numbered output gear (141), transmission gear (142), output gear (120), and the transmission shaft (14). The varying speed gear can be considered as the varying speed of the second speed gear.

To summarize the above-mentioned description, the push-moving fork (13) is furnished between the odd-numbered input gear 〔the first odd-numbered input gear (110) in the present embodiment〕 and the even-numbered input gear 〔the first even-numbered input gear (111) in the present embodiment〕.

The differential (15) driven by the output gear 〔the odd-numbered output gear (140) or the even-numbered output gear (141)〕 drives the output shaft (12) making the output shaft (12) output torque or power to further drive the differential (15).

The output gear employs respectively the odd-numbered gear pair 〔the first odd-numbered output gear (140)〕 and the even-numbered gear pair 〔the first even-numbered output gear (141)〕 to drive the transmission gear (142), and further to mesh to rotate through the transmission gear (142) and the output gear 〔the odd-numbered output gear (140) or the even-numbered output gear (141)〕

The push-moving fork (13), the odd-numbered gear pair 〔the first odd-numbered input gear (110) and the first odd-numbered output gear (140)〕 and the odd-numbered gear pair 〔the first even-numbered input gear (111) and the first even-numbered output gear (141)〕 form a varying speed mechanism of the second speed gear.

Figure 2:
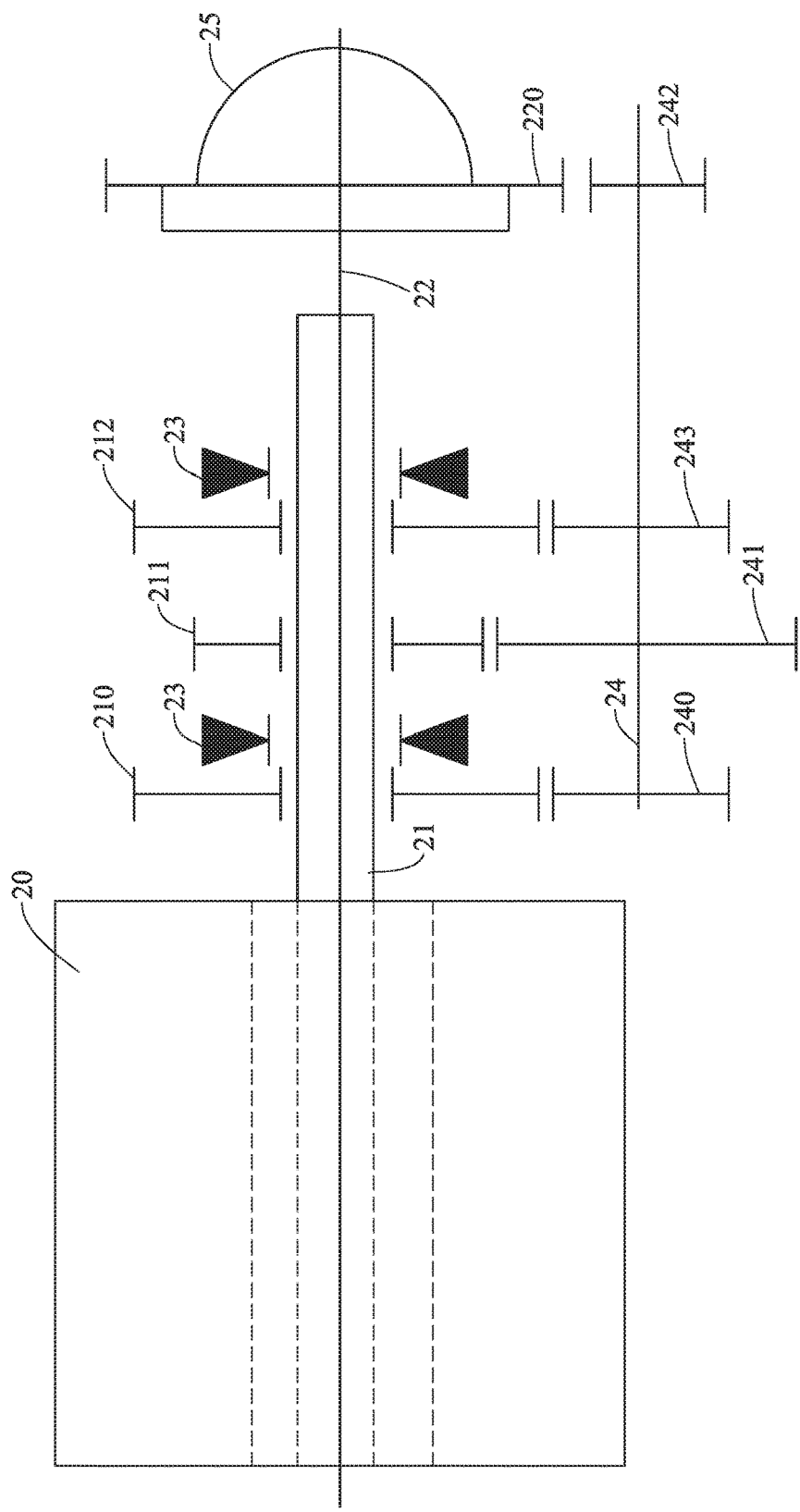
FIG. 2 is a schematic view of the second embodiment of the dual-shaft push-moving varying speed device of the disclosure.

FIG. 2 is a schematic view of the second embodiment of the dual-shaft push-moving varying speed device of the disclosure. As shown in FIG. 2, the dual-shaft push-moving varying speed device of the second embodiment of the disclosure being a three-speed varying speed system includes a drive unit (20), an input shaft (21), an output shaft (22), two push-moving forks (23), and a transmission shaft (24).

The input shaft (21) being coupled with the drive unit (20) includes a first odd-numbered input gear (210), a first even-numbered input gear (211) and a second odd-numbered input gear (212). The above-mentioned first odd-numbered input gear (210) and the second odd-numbered input gear (212) can be considered as the first speed gear and the third speed gear respectively while the first even-numbered input gear (211) can be considered as the second speed gear.

An end of the output shaft (22) is penetrated through the input shaft (21) and the drive unit (20) while the other end of the output shaft (22) has the output gears (220). The output gear (220) and the differential (25) are mutually connected.

One of the push-moving forks (23) is positioned between the first odd-numbered input gear (210) and the first even-numbered input gear (211) while the other push-moving fork (23) is adjacent to the second odd-numbered input gear (212).

The transmission shaft (24) includes a first odd-numbered output gear (240), a first even-numbered output gear (241), a second odd-numbered output gear (243), and a transmission gear (242). The first odd-numbered output gear (240) is meshed with the first odd-numbered input gear (210), the first even-numbered output gear (241) is meshed with the first even-numbered input gear (211) where the second odd-numbered output gear (243) is meshed with the second odd-numbered input gear (212) while the transmission gear (242) is meshed with the output gear (220).

As shown again in FIG. 2, the push-moving fork (23) pushes to move the first odd-numbered input gear (210). The power originated from the drive unit (20) performs varying speed of the gear through the first odd-numbered input gear (210), the first odd-numbered output gear (240), the transmission gear (242), the output gear (220), and the output shaft (22). The varying speed is considered as the first speed gear.

The push-moving fork (23) pushes to move the first even-numbered input gear (211). The power originated from the drive unit (20) performs varying speed of the gear through the first even-numbered input gear (211), the first even-numbered output gear (241), the transmission gear (242), the output gear (220) and the output shaft (22). The varying speed is considered as the first speed gear.

The push-moving fork (23) pushes to move the second odd-numbered input gear (212). The power originated from the drive unit (20) performs varying speed of the gear through the second odd-numbered input gear (212), the second odd-numbered output gear (243), the transmission gear (242), the output gear (220), and the output shaft (22). The varying speed is considered as the third speed gear.

As described above, the two push-moving forks (23), the two odd-numbered gear pairs 〔the first odd-numbered input gear (210), the first odd-numbered output gear (240), the second odd-numbered input gear (212) and the second odd-numbered output gear (243)〕, an even-numbered gear pair 〔the first even-numbered input gear (211) and the first even-numbered output gear (241)〕 form varying speed mechanism of a third speed gear.

Figure 3:
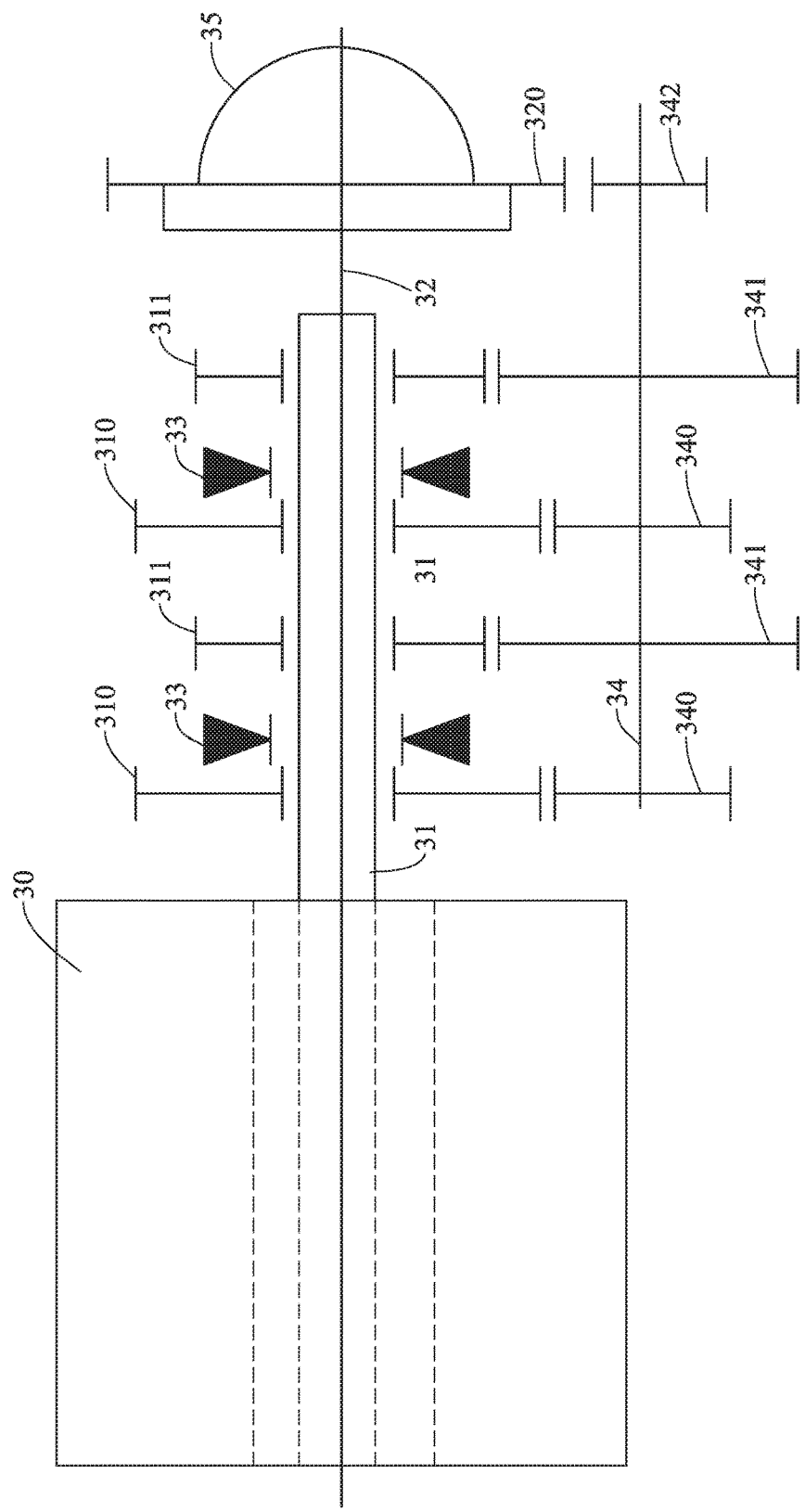
FIG. 3 is a schematic view of the third embodiment of the dual-shaft push-moving varying speed device of the disclosure.

FIG. 3 is a schematic view of the third embodiment of the dual-shaft push-moving varying speed device of the disclosure. As shown in FIG. 3, the dual-shaft push-moving varying speed device of the third embodiment of the disclosure being a varying speed system of the fourth speed gear includes a drive unit (30), an input shaft (31), an output shaft (32), a plurality of push-moving fork (33), and a transmission shaft (34).

The input shaft (31) being coupled with the drive unit (30) has a plurality of odd-numbered input gears (310) and a plurality of odd-numbered input gears (311). Each of the odd-numbered input gears and each of the even-numbered input gears are sequentially furnished at the input shaft (31). Those odd-numbered input gears and even-numbered input gears can be considered as the first speed gear and the $N^{th}$ speed gear.

An end of the output shaft (32) is penetrated through the input shaft (31) and the drive unit (30) while the other end of the output shaft (32) possesses an output gear (320). The output gear (320) is either coupled with a differential (35) or, the output shaft (32) is mutually connected to the differential (35).

Each of the push-moving forks (23) is positioned between each the first odd-numbered input gears (310) and each of the first even-numbered input gear (211).

The transmission shaft (34) possesses a plurality of odd-numbered output gears (340), a plurality of even-numbered output gears (341), and a transmission gear (342). Each of the odd-numbered output gears (340) is meshed with the corresponding odd-numbered input gears (310) while each of the even-numbered output gears (341) is meshed with the corresponding even-numbered input gears (311). The transmission gear (342) is meshed with the output gear (320).

As shown again in FIG. 3, the push-moving fork (33) pushes to move the odd-numbered input gear (310) making the input shaft (31) driven by the drive unit (30) drive the odd-numbered input gear (310). The odd-numbered input gear (310) drives the odd-numbered output gear (340) while the odd-numbered output gear (340) drives the transmission shaft (34).

Sequentially, the transmission shaft (34) drives the transmission gear (342), the transmission gear (342) drives the output gear (320), the driven output gear (320) further drives the output shaft (32) so as to make the output shaft (32) outputs torque or power to drive the differential (15).

The drive unit (30) continuously drives the input shaft (31). The push-moving fork (33) is departed from the odd-numbered input gear (310) which does not drive the odd-numbered output gear (340) anymore.

The push-moving fork (33) pushes to move the even-numbered input gear (311) making the input shaft (31) driven by the drive unit (30) drive the even-numbered input gear (311) which again drive the even-numbered output gear (341).

The transmission shaft (34) is to drive the transmission gear (342) which drives the output gear (320). The driven output gear (320) drives the output shaft (32) making the output shaft (32) output torque or power to further drive the differential (35).

The drive unit (30) continuously drives the input shaft (31). The push-moving fork (33) is departed from the even-numbered input gear (311) which does not drive the even-numbered output gear (341) anymore.

The other push-moving fork (33) pushes to move the odd-numbered input gear (310) making the input shaft (31) driven by the drive unit (30) drive the pushed odd-numbered input gear (310) which again drive the other odd-numbered output gear (340). The odd-numbered output gear (340) further drives the transmission shaft (34).

The transmission shaft (34) is to drive the transmission gear (342) which is to drive the output gear (320). The driven output gear (320) further drives the output shaft (32) making the output shaft (32) output torque or power to further drive the differential (35).

The push-moving fork (33) is departed from the odd-numbered input gear (310) which does not drive the odd-numbered output gear (340) anymore.

The other push-moving fork (33) pushes to move the other even-numbered input gear (311) making the input shaft (31) driven by the drive unit (30) drive the pushed even-numbered input gear (311). The driven even-numbered input gear (311) in turn drives the other even-numbered output gear (341). The driven even-numbered output gear (341) then drives the transmission shaft (34).

The transmission shaft (34) is to drive the transmission gear (342) which is to drive the output gear (320). The driven output gear (320) further drives the output shaft (32) making the output shaft (32) output torque or power to further drive the differential (35).

Any push-moving fork (33) can sequentially pushes to move the corresponding odd-numbered input gear (310) or even-numbered input gear (311) making the pushed odd-numbered input gear (310) or even-numbered input gear (311) drive the corresponding odd-numbered output gear (340) or even-numbered output gear (341).

As described above, the push-moving fork (33) pushes to move the odd-numbered input gear (310), and the power, originated from the drive unit (30), performs a varying speed gear sequentially through the odd-numbered input gear (310), the odd-numbered output gear (340), the transmission gear (342), the output gear (320), and the transmission shaft (34). The varying speed gear can be considered as the odd-numbered varying speed, e.g. the first speed gear, the third speed gear, the fifth speed gear, till the $(N-1)^{th}$ speed gear, where (N−1) is an odd number.

The push-moving fork (33) pushes to move the even-numbered input gear (311), and the power, originated from the drive unit (30), performs a varying speed gear sequentially through the even-numbered input gear (311), the even-numbered output gear (341), the transmission gear (342), the output gear (320), and the transmission shaft (34). The varying speed gear can be considered as the even-numbered varying speed, e.g. the second speed gear, the fourth speed gear, the sixth speed gear, till the $N^{th}$ speed gear, where N is an even number.

As described above, the two push-moving forks (33), the two odd-numbered gear pairs 〔the two odd-numbered input gears (310) and the two odd-numbered output gears (340)〕 and the two even-numbered gear pairs 〔the two even-numbered input gears (311) and the two even-numbered output gears (141)〕 form a varying speed mechanism of the fourth speed gear.

To summarize the above description, the dual-shaft push-moving varying speed device of the disclosure is to employ a dual-shaft structure formed by having the output shaft penetrate through the input shaft. Moreover, the push-moving fork, the input shaft, and the output shaft are a common-shaft design. Therefore, the dual-shaft structure and the common-shaft design are capable of effectively diminishing the overall volume of the varying speed mechanism by at least 38%.

It will become apparent to those people skilled in the art that various modifications and variations can be made to the structure of the disclosure without departing from the scope or spirit of the disclosure. In view of the foregoing description, it is intended that all the modifications and variation fall within the scope of the following appended claims and their equivalents.

What is claimed is:

1. A dual-shaft push-moving varying speed device, comprising:
   a drive unit;
   an input shaft having at least an odd-numbered input gear and at least an even-numbered input gear is coupled with the drive unit;
   an output shaft with an end thereof penetrates through the input shaft and the drive unit, while its other end has an output gear;
   a transmission shaft having at least an odd-numbered output gear meshing with the corresponding odd-numbered input gear; at least an even-numbered output gear meshing with the corresponding even-numbered input gear, and a transmission gear meshing with the output gear; and
   at least a push-moving fork furnished between the odd-numbered input gear and the even-numbered input gear, and is selectively pushed to move the odd-numbered input gear and the even-numbered input gear.

2. The dual-shaft push-moving varying speed device as claimed in claim 1, wherein the input shaft being a hollow shaft is provided for the output shaft to penetrate through to form a dual-shaft structure.

3. The dual-shaft push-moving varying speed device as claimed in claim 2, wherein the odd-numbered input gear and the even-numbered input gear being secured at the outer edge of the input shaft rotate together with the input shaft.

4. The dual-shaft push-moving varying speed device as claimed in claim 1, wherein the output shaft is parallel to the transmission shaft.

5. The dual-shaft push-moving varying speed device as claimed in claim 1, wherein the drive unit drives the input shaft to rotate.

6. The dual-shaft push-moving varying speed device as claimed in claim 1, wherein the push-moving fork pushes the odd-numbered input gear to move, and the power performs a varying speed of the first gear through the odd-numbered input gear, the odd-numbered output gear, the transmission gear, and the output shaft.

7. The dual-shaft push-moving varying speed device as claimed in claim 1, wherein the push-moving fork pushes the even-numbered input gear to move, and the power perform a varying speed of first speed gear through the even-numbered input gear, the even-numbered output gear, the transmission gear, the output gear, and the output shaft.

8. The dual-shaft push-moving varying speed device as claimed in claim 1, wherein the push-moving fork is plural in number.

9. The dual-shaft push-moving varying speed device as claimed in claim 1, wherein the number of the push-moving fork is setup to be two, and a set-up of another odd-numbered input gear is added to act as a newly added varying speed gear.

10. The dual-shaft push-moving varying speed device as claimed in claim 1, wherein the push-moving fork, the odd-numbered input gear, and the even-numbered input gear are plural in number making those odd-numbered input gear and those odd-numbered input gear form a plurality of varying speed gears.

11. The dual-shaft push-moving varying speed device as claimed in claim 10, wherein the output shaft (12) is connected to a differential.

12. The dual-shaft push-moving varying speed device as claimed in claim 10, wherein the push-moving fork is furnished between the odd-numbered input gear and the even-numbered input gear.

13. The dual-shaft push-moving varying speed device as claimed in claim 1 further comprising a differential.

14. The dual-shaft push-moving varying speed device as claimed in claim 13, wherein the output gear drives the output shaft to make the output shaft output torque or power to further drive the differential.

15. The dual-shaft push-moving varying speed device as claimed in claim 13, wherein the output gear is meshed with the transmission gear which is driven by either the odd-numbered gear pair or the even-numbered gear pair.

16. The dual-shaft push-moving varying speed device as claimed in claim 1, wherein the push-moving fork, the odd-numbered gear pair, and the even-numbered gear pair form a varying speed mechanism of the second speed gear.

17. The dual-shaft push-moving varying speed device as claimed in claim 9, wherein the two push-moving forks, two odd-numbered gear pairs, and an even-numbered gear pair form a varying speed mechanism of the third speed gear.

18. The dual-shaft push-moving varying speed device as claimed in claim 9, wherein the two push-moving forks, two odd-numbered gear pairs, and two even-numbered gear pairs form a varying speed mechanism of the fourth speed gear.

19. The dual-shaft push-moving varying speed device as claimed in claim 17, wherein the push-moving fork is furnished between the odd-numbered input gear and the even-numbered input gear to selectively push the odd-numbered input gear or the even-numbered input gear to move, while another push-moving fork is adjacent to another odd-numbered input gear to selectively push another odd-numbered input gear to move.

20. The dual-shaft push-moving varying speed device as claimed in claim 18, wherein the push-moving fork is furnished between the odd-numbered input gear and the even-numbered input gear to selectively push the odd-numbered input gear or the even-numbered input gear to move, while another push-moving fork is furnished between another odd-numbered input gear and another even-numbered input gear to selectively push another odd-numbered input gear or another even-numbered input gear to move.

* * * * *